Jan. 23, 1968 W. C. ALBERTSON ETAL 3,364,728
METHOD AND APPARATUS FOR SUPPORTING AND GAUGING AN ARTICLE
Filed April 27, 1965 5 Sheets-Sheet 1

INVENTORS
WILLIAM C. ALBERTSON
JIM C. CAHLIK
BY W. A. Schaich &
Charles S. Lynch
ATTORNEYS

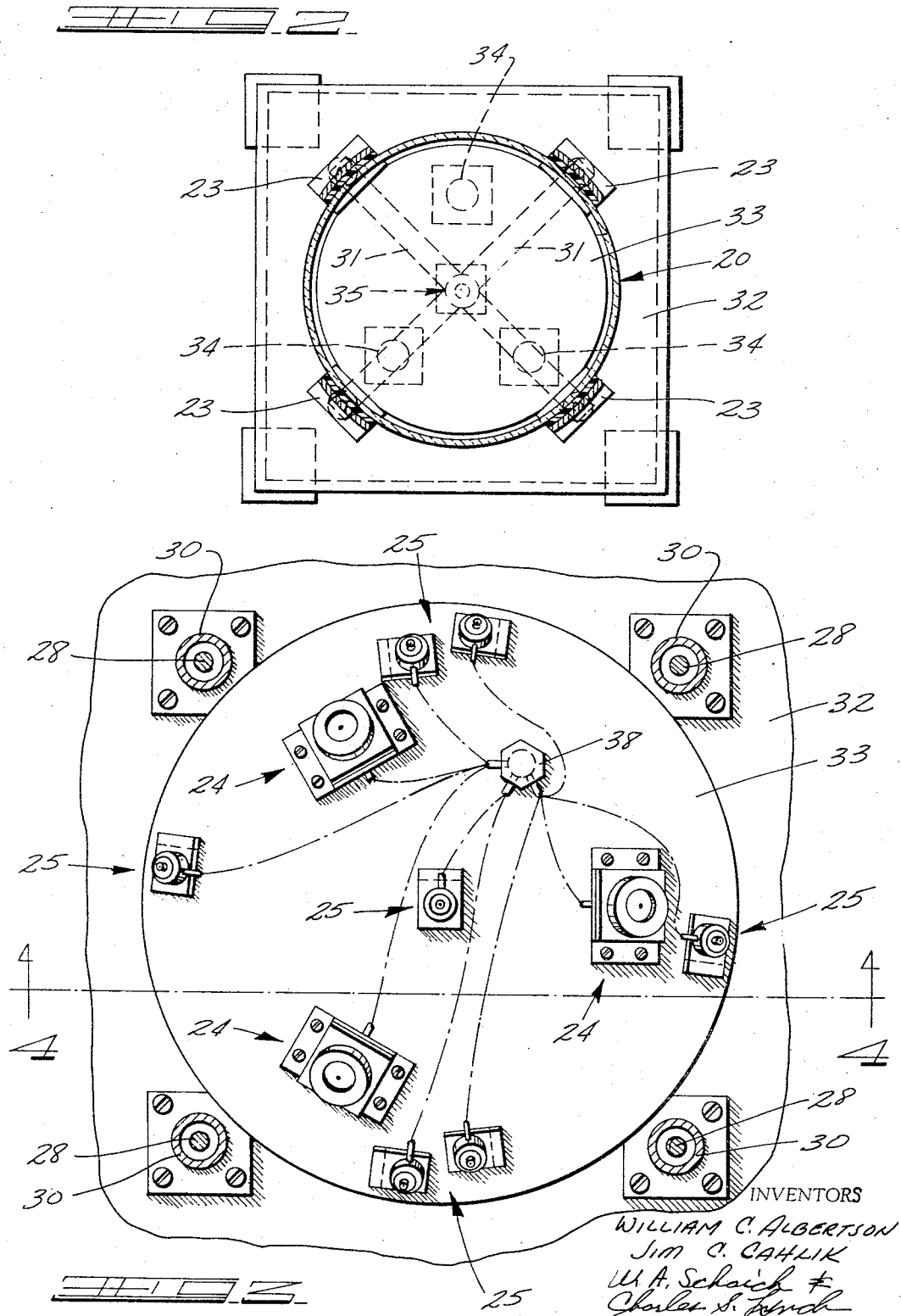

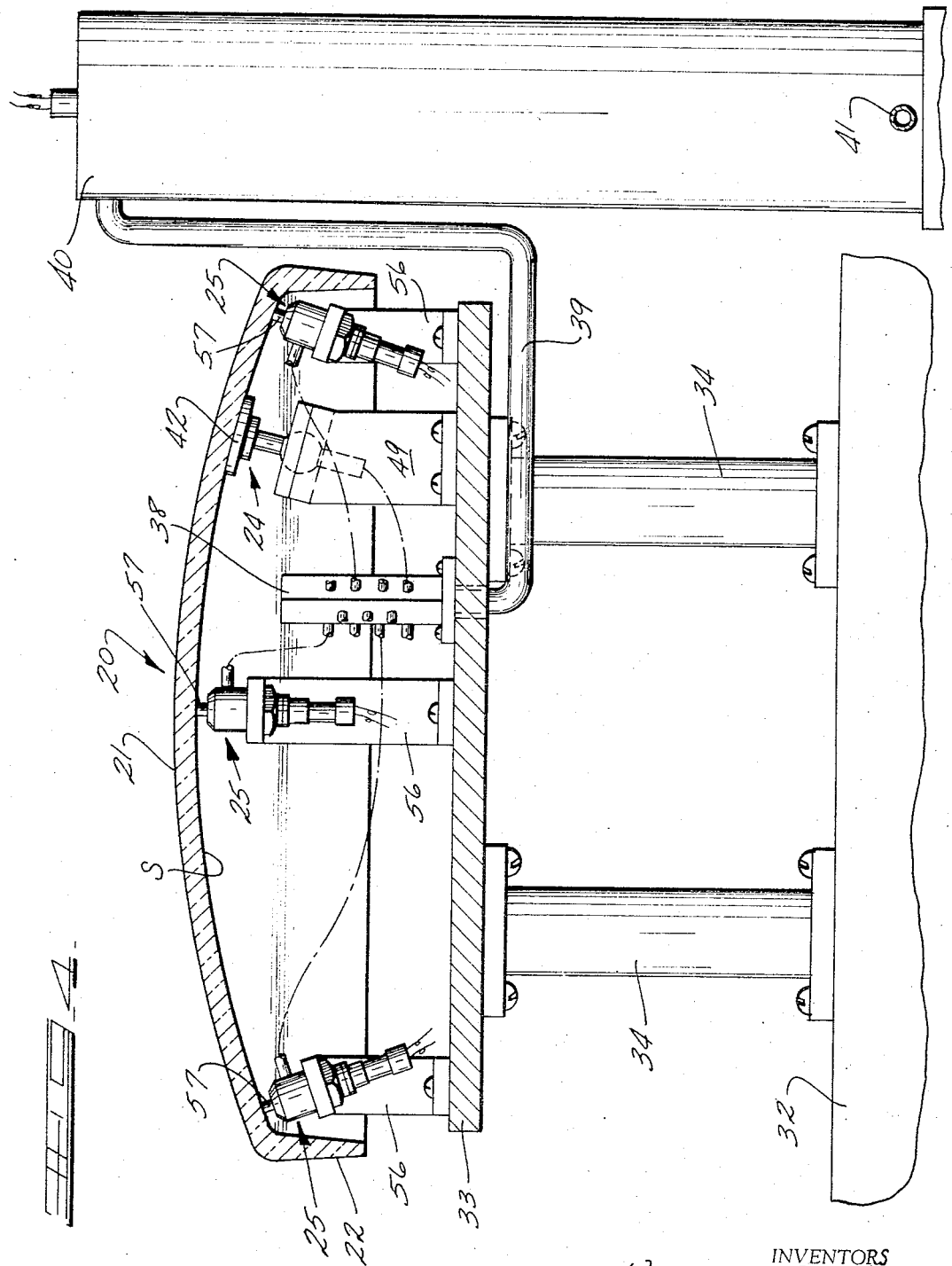

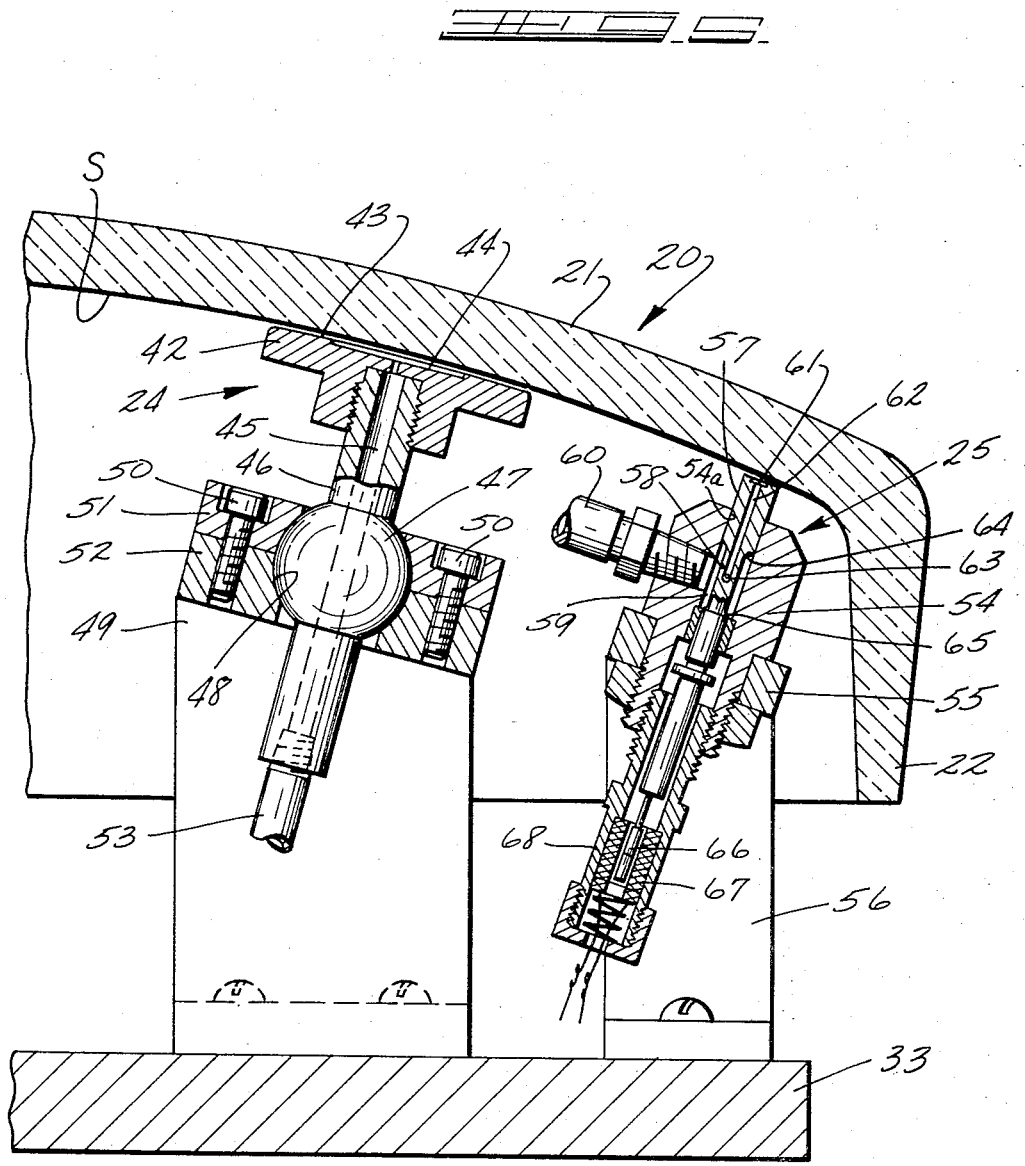

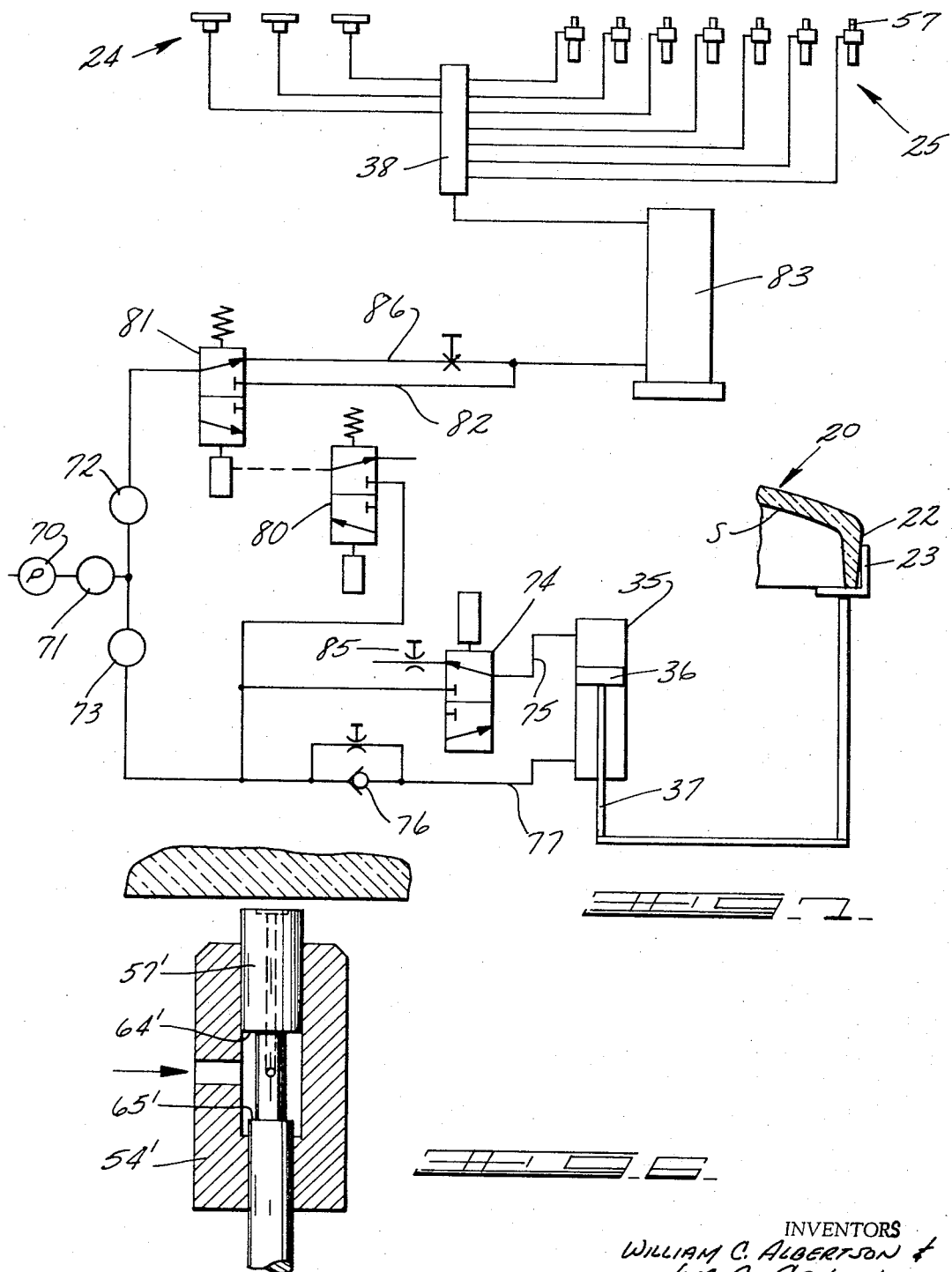

United States Patent Office 3,364,728
Patented Jan. 23, 1968

3,364,728
METHOD AND APPARATUS FOR SUPPORTING AND GAUGING AN ARTICLE
William C. Albertson, Lakewood, and Jim C. Cahlik, Parma, Ohio, assignors to Owens-Illinois Glass Company, a corporation of Ohio
Filed Apr. 27, 1965, Ser. No. 451,168
11 Claims. (Cl. 73—37.5)

ABSTRACT OF THE DISCLOSURE

Method and apparatus are disclosed for supporting an article such as a face plate of a cathode ray tube at a plurality of points, moving the face plate against a plurality of fluid bearing pads to support the face plate by the pads, positioning a sensing nozzle adjacent the inner surface of the viewing portion of the face plate and directing fluid under pressure through the nozzle so that the nozzle is levitated in predetermined spaced relation to the surface. The method and apparatus also sense the position of the nozzle and create a signal when the position of the nozzle deviates.

---

This invention relates to gauging and particularly to inspecting the relative position of the surface of an article with relation to a fixed point or points on the article.

In the manufacture of various articles, it is desirable to be able to inspect the dimension or contour of a surface of an article without contacting the surface either because of the condition of the article or the degree of accuracy of the surface. Contacting gauges which have been heretofore used will scratch or mar the surface. It has heretofore been suggested that air gauges be used in which air is directed from a nozzle against a surface and as the surface varies by moving relatively toward and away from the nozzle, a variation in pressure occurs which is sensed. Such air gauges have substantial accuracy but are subject to the disadvantage that they are incapable of sensing wide variations in dimension.

In the manufacture of glass cathode ray tube face plates which have a peripheral flange and a viewing portion, it is especially important that all portions of the internal surface be at a predetermined distance with respect to the position of the electron gun. It has heretofore been suggested that such inspection utilize micrometer dial gauges which contact the surface. In addition to being large, bulky and subject to inaccuracies and wear, such gauges contact the surface and therefore are liable to scratch or mar the surface.

It is also desirable to be able to gauge such face plates when they are hot from the forming operation and before they are further treated as by annealing and the like. In order to do this, it would be essential to gauge the articles without in any way contacting the hot surface of the face plate and at the same time supporting the article so that the surface can be easily gauged.

It is therefore an object of this invention to provide a method and apparatus for both supporting and gauging the relative position of a surface of an article with respect to a fixed point without contacting the surface.

It is a further object of this invention to provide such a method and apparatus for supporting and gauging articles which are in relatively hot condition.

Basically, the method and apparatus involves supporting the article momentarily from the periphery of the article at portions which are not critical from the standpoint of the surface, moving the article downwardly into position wherein a plurality of air bearing pads support the article by fluid passing between the pads and the surface of the article, and wherein a plurality of sensing nozzles are supported adjacent the downwardly facing surface to be inspected for movement toward and away from the surface. Air or similar fluid is directed against the inner end of each nozzle and through each nozzle so that air flows laterally between the end of the nozzle and the surface being inspected. This causes the nozzle to be levitated in predetermined spaced relation to the surface by the combined action of the pressure forces due to ambient or atmospheric pressure on the nozzle and the forces due to the flow of air through the nozzle and between the end of the nozzle and the surface of the article to be gauged, and the weight of the nozzle, all of which reach an equilibrium condition. This equilibrium condition is such that any tendency of the nozzle to deviate from the constant spaced relation to the surface is momentarily opposed by an unbalanced force which returns the nozzle to its constant spaced relation. Thus, as the surface varies dimensionally, the nozzle follows the surface and the position of the nozzle, which corresponds to the position of the surface, can be sensed by any accurate gauging apparatus such as a differential transformer. After the inspection is completed, the article such as a face plate is lifted upwardly away from the air bearing pads and discarded or permitted to continue for subsequent operations thereon.

In the drawings:

FIG. 2 is a sectional view taken along the line 2—2 in FIG. 1.

FIG. 3 is a fragmentary sectional view taken along the line 3—3 in FIG. 1.

FIG. 4 is a fragmentary sectional view taken along the line 4—4 in FIG. 3.

FIG. 5 is a sectional view of a portion of the apparatus shown in FIG. 4 on an enlarged scale.

FIG. 6 is a diagrammatic sectional view of the novel sensing nozzle utilized in the apparatus.

FIG. 7 is a schematic pneumatic diagram of the apparatus.

Figure 1:
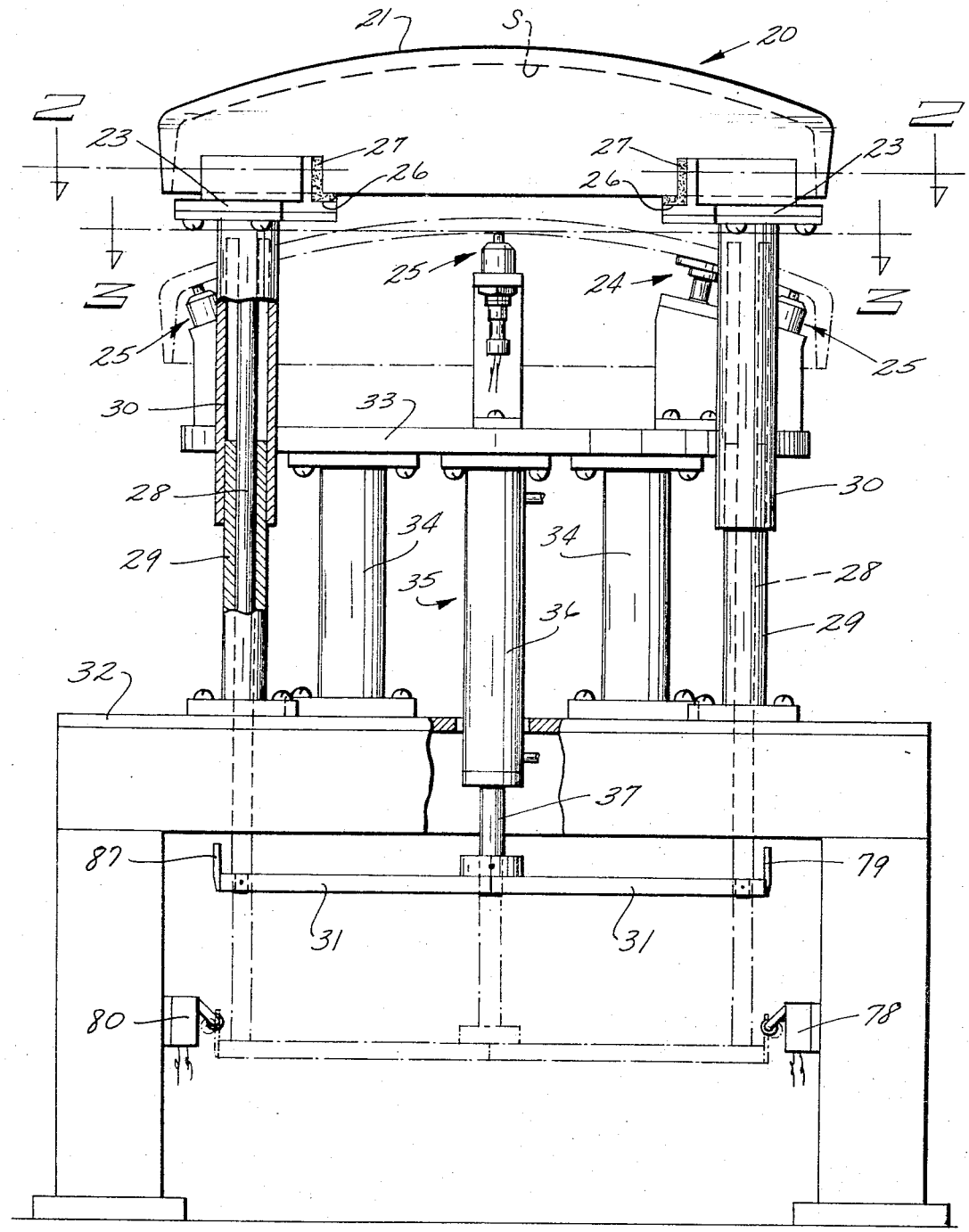
FIG. 1 is a part sectional elevational view of an apparatus embodying the invention for supporting and gauging a cathode ray tube face plate.

Referring to FIG. 1, the invention is shown and described in connection with the gauging of the internal surface S of a cathode ray tube face plate 20 which comprises a viewing portion 21 and a peripheral flange portion 22. When such a face plate is utilized in connection with color television, it is provided with circumferentially spaced radially inwardly extending studs, not shown, which support the frame of a color controlling element or mask as is well known in the art. In use, it is essential that all portions of the surface S be in predetermined relation to a fixed point where the electron gun is positioned and directs the electrons toward the inner surface S of the face plate. Accordingly, it is essential to inspect the face plate and ascertain that the various portions of the surface S are in proper relation.

In accordance with the invention, the face plate 20 is to be inspected while it is still hot immediately after it has been formed, for example, by pressing a charge of glass. In accordance with the invention, the face plate 20 is placed with the flange portion 22 extending downwardly and supported on a plurality of circumferentially spaced supports 23. The supports 23 are then lowered to move the face plate 20 downwardly into position where it is supported in a predetermined position by air bearing pads 24 (FIG. 3) where it is inspected by a plurality of sensing nozzle assemblies 25, as presently described.

Referring to FIG. 1, each of the supports 23 has a generally L-shaped support area 26 in which a L-shaped heat resistant member 27 is positioned to engage the flange 22 and hold it in general position for inspection. Each pad 23 is, in turn, supported on the upper end of a rod 28 that is movable upwardly and downwardly in a post 29 which in turn extends upwardly above a frame 32. A sleeve 30 is fixed to each pad 26 and telescopes about the rod 28 and sleeve 29. The lower ends of the rods 28 are interconnected by cross bars 31 (FIGS. 1 and 2).

The air bearing pads 24 and sensing assemblies 25 are mounted in predetermined positions on a table 33 which is supported on the frame 32 by columns 34. A piston motor 35 has its cylinder 36 fixed to the underside of the table 33 and its piston rod 37 connected to the cross arms 31. Thus, by controlling the flow of fluid to the cylinder 35, the supports 23 can be lowered and raised to bring the face plate 20 into and out of position adjacent the air bearing pads 24 and sensing assemblies 25.

In order that substantially the same areas of successive face plates are gauged each time, an appropriate scribe mark is provided on one of the supports 23 and is adapted to serve as a reference adjacent which a projection on the face plate is positioned. In the manufacture of glass face plates, it is conventional to include locating projections in the flange which are used as reference points for subsequent insertion of the studs in the flange portion of the face plates, which studs support the frame of the color controlling element or mask. Thus, if each face plate to be inspected is positioned with the reference projection thereon adjacent the same support 23, then the same surface of the face portion will be gauged on succeeding face plates.

Air is supplied to each of the air bearing pads 24 and sensing assemblies 25 from a header 38 to which air is supplied through a pipe 39 from an air heater 40 (FIG. 4). The air heater 40, in turn, has an inlet 41 to which air under pressure is supplied.

Referring to FIG. 5, each of the air bearing pads 24 includes a head 42 having a surface 43 that has a general curvature of the underside of the portion of surface S which is adjacent the pad 24. The head 42 also includes a recess 44 to which fluid is supplied through an opening 45 of a pad body 46 threaded into the head 42. The body 46 includes a spherical enlargement 47 by which it is mounted in a spherical seat 48 of a bracket 49 that is fixed to the table 33. In use, the body 46 is angularly adjusted with respect to the seat 48 and screws 50 are tightened to lock a ring 51 with respect to a base portion 52 of bracket 49 and thereby lock the pad 24 in proper angular position so that when the face plate 20 is moved downwardly, the surface 43 of the head 42 will conform with the contour of the adjacent surface portion of surface S. When the face plate 20 is moved downwardly and air is supplied through pipe 53 to each recess 44, a continuous film of air is caused to pass between the surfaces 43 of pads 24 and the adjacent portions of the inner surface S. The combined action of atmospheric pressure on the face plate, the weight of the face plate and the film of air serve to support the face plate 20 in predetermined spaced relation to the pads 24.

Referring to FIG. 5, each of the sensing assemblies 25 is mounted at a predetermined point and comprises a body or housing 54 that is mounted on a horizontal base 55 of bracket 56 fixed to the table 33. Body 54 is provided with an opening 54' therethrough and a nozzle stem 57 is mounted for reciprocating movement in the opening 54a. Stem 57 has a portion 58 of reduced diameter providing a space 59 in the body 54 to which fluid such as air under pressure is supplied from header 38 by pipe 60. The upper end of the stem 57 is formed with a recess 61. An axial opening 62 and radial openings 63 provide communication between recess 61 and space 59. Fluid under pressure is thereby applied to the upper end of the nozzle stem 57 and flows between the end of the nozzle stem 57 and the surface S when the nozzle stem 57 is adjacent the surface S, as presently described.

The fluid also acts upon a shoulder 64 and a shoulder 65 on nozzle stem 57. The area of the shoulder 64 is greater than the area of the shoulder 65 so that there is a resultant upward force when air is being supplied. This force compensates for the weight of the nozzle stem 57 and parts thereon and also the jet effect of the air emanating from the upper end of the nozzle 61 which tend to move the stem 57 downwardly. Thus, when the air is flowing, the nozzle stem 57 is supported with the upper end thereof extending above housing 54 so that when the face plate 20 is moved downwardly the nozzle stem 57 will be in position to assume a constant spaced relation to the surface S. As the face plate 20 is moved into position to be supported by air bearing pads 24, the downwardly facing surface S of the face plate 20 approaches the upper end of each nozzle stem 57. As this occurs, the air flowing through nozzle opening 62 moves laterally between the end of the nozzle stem 57 and the surface S to create a reduced pressure condition as the air flows from the center of the end of the nozzle stem 57 to the periphery of the end of the nozzle stem 57. The combined action of the forces due to ambient or atmospheric pressure on the nozzle stem 57 and the forces due to the flow of air through the nozzle stem 57 and between the end of the nozzle stem 57 and the surface of the article to be gauged cause the nozzle stem 57 to be levitated in constant spaced relation to the surface S. Specifically, these forces reach an equilibrium condition with the other forces on the nozzle stem including the weight and the pressure force due to the difference in the areas of shoulders 64, 65. This equilibrium condition is such that any tendency of the nozzle stem 57 to deviate from a constant spaced relation to the surface S is momentarily opposed by an unbalanced force which returns the nozzle to its constant spaced relation.

Thus, as the contour of the face plate may vary between one face plate and another, the nozzle stem 57 will assume a different position with respect to housing 54. The lower end of the nozzle stem 57 has an armature 66 thereon which is a part of the differential transformer winding 67 mounted in a transformer housing 68 on the lower end of the housing 54. Thus, any change in the position of the stem 57 axially will produce a change in the output of the transformer which can be amplified to produce a signal or compared with a standard to produce a reject signal.

The manner in which the sensing assembly compensates for the weight and jet effect of the stem can be more readily understood by reference to the diagram in FIG. 6 wherein the parts have been given identical numbers except that they have prime marks. As shown in FIG. 6, the area $A_1$ of the surface 64' is greater than the area $A_2$ of the surface 65'. Thus, there is a net force F which urges the nozzle stem 57' upwardly which is in accordance with the relationship $F \cong P_1(A_1 - A_2)$. The areas of the surface $A_1$ and $A_2$ are calculated such that the force F is equal to or greater than the weight of the nozzle stem 57' and the jet effect of the fluid which is expelled from the upper end of the stem 57' and normally tends to urge the stem downwardly.

As the face plate is brought into position adjacent the sensing assemblies 25 and a fluid film is caused to flow between the end of each nozzle stem 57' and the surface of the face plate, each nozzle stem 57' is then caused to levitate in constant predetermined accurate relation to the surface. As the corresponding portion of the surface of succeeding face plates varies vertically with relation to the air bearing pads, the corresponding nozzle stem will move vertically to maintain the predetermined constant relation with respect to surface S.

The pneumatic system for controlling the flow of air to the pad can be more readily understood by reference to FIG. 7. As shown in FIG. 7, air under pressure from pump 70 flows through a filter 71 to pressure regulators 72, 73. Pressure regulator 72 controls the flow of fluid to the pressure pads 24 and nozzle assemblies 25 whereas pressure regulator 73 controls the flow of fluid to the cylinder 35 for lowering and raising the support 23 which moves the face plate into and out of gauging position.

A lift control valve 74 is provided and manually controlled to control the flow of fluid to the cylinder 35. After a face plate 20, which is hot from the forming operation, is placed on support 23, the control valve 74 is positioned to the lowering position so that fluid pressure is directed to the upper end of the cylinder 35 through line 75. Due to the difference in effective area between the upper and lower ends of the piston in cylinder 35, a downward force is provided which forces the rod 37 downwardly to lower the pads 23. A ball check valve 76 in line 77, connected to the lower end of the cylinder 35, functions as a speed control to control the speed of lowering of the pads 23. As the face plate approaches the bearing pads 24, a switch 78 is operated by a cam 79 which in turn activates a data logger (not shown) or gives a signal indicating the start of the gauging cycle. A pilot valve 80 (FIG. 1) is contacted by a cam 87 on cross arms 31 which, in turn, directs fluid to the air control valve 81. The air control valve 81 then operates to cause fluid to flow through line 82 through an electric air heater 83 to the header 38 and then to the air bearing pads 24 and sensing assemblies 25.

As the piston 36 of cylinder 35 continues downwardly, the face plate is positioned on the bearing pads 24 and the supports 23 move away from the flange portion 22 of the face plate 20 leaving the face plate 20 supported by the bearing pads 24. At the bottom of the stroke of the cylinder 35, the supports 23 are maintained out of position.

The sensing assemblies 25 are now in position so that the nozzle stems 57 thereof assume the predetermined relation with respect to the surface S and the differential transformer accordingly produces a signal corresponding to the relative position of the portions of the surfaces adjacent each nozzle stem 57 with respect to the supports 23 of the bearing pads 24.

When the gauging cycle is completed, the control valve 74 is manually shifted to the raising position and fluid pressure in the upper end of the cylinder 35 is permitted to exhaust to the atmosphere through a restricted exhaust 85. As the fluid pressure within the upper end of the cylinder 35 decreases, the fluid pressure due to line pressure within the lower end of cylinder 35 urges the piston and the piston rod 37 upwardly thereby elevating the supports 23 to lift the face plate out of gauging position away from the bearing pads 24 and the sensing assemblies 25. As the supports 23 are moved upwardly, cam 87 moves away from pilot valve 80 to permit the pilot valve 80 to return to its original position thereby interrupting the flow of fluid to the control valve 81 and, in turn, the flow of heated air to the bearing pads 24 and nozzle assemblies 25. Simultaneously, cam 79 moves away from switch 78 to stop the data loger or gaging signal. The cylinder 35 continues to operate to lift the supports 23 and raise the face plate 20 into position where it can be lifted off of the support 23 and either rejected or permitted to pass to subsequent operations.

In order to maintain the heated air in condition and the various parts in condition for more accurate operation, provision is made by a line 86 for a small quantity of heated air to continuously flow through the bearing pads 24 and sensing assemblies 25 even during the portion of the cycle when no gauging is occurring.

It can thus be seen that there has been provided a method and apparatus for gauging the surfaces of articles such as the inner surface of the viewing portion of a television tube face plate without contacting the viewing portion. During the gauging operation, the article is supported without direct contact. The use of heated air permits the gauging to be performed when the article is hot, as for example, just after the glass face plate has been formed. Thus, articles that do not meet the desired standards can be discarded and need not be processed further so that savings are achieved.

As will be apparent, the difference in the areas of the shoulders 64, 65 produces a resultant upward force that maintains the upper ends of the nozzle stem 57 in the path of the face plate as it is lowered. As previously discussed, as the face plate is brought into position, the forces on the nozzle due to fluid pressure, including the pressure force of ambient air and the pressure forces due to flow through the nozzle stem and between the ends of the nozzle stem and the surfaces of the face plate serve to levitate the nozzle stem in constant spaced relation to the surface. We have found that the nozzle stem can be mounted to operate at an angle to the vertical or inverted 180 degrees and a predetermined relation will be maintained between the stem and the surface, although the distance may be different at different angles or orientations. If it is desired to maintain the same distance between the ends of the stem and the surface when the stem is oriented at 180 degrees, then the areas of the shoulder 64, 65 can be changed in order to compensate for the fact that the weight of the stem assists in projecting the stem downwardly.

It can be appreciated that the reference to atmospheric or ambient air pressure relates to a constant pressure on the end of the nozzle stem so that ambient pressure force can be replaced by some higher or lesser force provided that it remains constant.

Satisfactory results have been achieved in a nozzle assembly embodying the invention wherein the nozzle stem was made of 303 stainless steel and had the following dimensions:

| | Inch |
|---|---|
| Distance from end to shoulder 64 | ½ |
| Distance from end to shoulder 65 | 1 |
| Distance to intermediate flange | 1.5 |
| Thickness of flange | 3/32 |
| Distance from flange to lower end | 1 13/32 |
| Diameter of upper end | .248 |
| Diameter of recess 61 | ⅛ |
| Depth of recess 61 | .010 |
| Diameter of bore 62 | .062 |
| Diameter of reduced portion 58 | .156 |
| Diameter of portion below shoulder 65 | .217 |
| Diameter of portion below intermediate flange | 3/16 |
| Length of first portion below flange | 1 3/16 |
| Length of second reduced portion below flange | .35 |
| Diameter of second reduced portion below flange | .10 |

When air pressures on the order of 15 to 40 pounds per square inch were applied to the nozzle assembly, a constant levitation was achieved at each air pressure.

The term "fluid" as used herein is intended to cover compressible and incompressible fluids such as gases and liquids although it has been found that gaseous fluids produce good results and have the advantage of not requiring provisions for draining and collecting the fluid.

We claim:
1. The method of supporting and gauging the inner surface of a cathode ray tube face plate which has a viewing portion and a peripheral flange portion which comprises:
   supporting said face plate at a plurality of points along said flange portion,
   moving said face plate relatively downwardly adjacent a plurality of fluid bearing pads,
   directing fluid through said fluid bearing pads upwardly to provide a film of fluid between said bearing pads and the inner surface of the viewing portion thereby supporting the face plate on said bearing pads,
   removing the supports from the peripheral flange portion of said face plate,
   positioning at least one sensing nozzle adjacent the inner surface of the viewing portion of the face plate,
   supporting said sensing nozzle for movement upwardly toward and downwardly away from said surface, directing fluid under pressure against a portion of the nozzle to urge the nozzle in a direction toward the surface of the article to be gauged until the article is moved into gauging position, directing a jet of fluid through said nozzle against said surface such that said nozzle is levitated in predetermined spaced relation to said surface by the combined action of the forces due to fluid pressure on said nozzle and the forces due to pressure of fluid flowing out of said nozzle and due to fluid flowing between said nozzle and said surface, sensing the position of said nozzle, and creating a signal when the position of said nozzle deviates.

2. The method of supporting and gauging the inner surface of a hot cathode ray tube face plate which has a viewing portion and a peripheral flange portion which comprises:

supporting said face plate at a plurality of points along said flange, moving said face plate relatively downwardly onto a plurality of fluid bearing pads, directing heated fluid through said air bearing pads upwardly to provide a film of air for supporting said face plate along the inner surface of the viewing portion thereby supporting the face plate on said bearing pads, removing the support from the peripheral flange of said face plate, positioning at least one sensing nozzle adjacent the inner surface of the viewing portion of the face plate, supporting said sensing nozzle for movement upwardly toward and downwardly away from said surface, directing fluid under pressure against a portion of the nozzle to urge the nozzle in a direction toward the surface of the article to be gauged, directing a jet of heated fluid through said nozzle against said surface such that said nozzle is levitated in predetermined spaced relation to said surface by the combined action of the forces due to fluid pressure on said nozzle and the forces due to pressure of fluid flowing out of said nozzle and due to fluid flowing between said nozzle and said surface, sensing the position of said nozzle, and creating a signal when said nozzle position deviates.

3. An apparatus for supporting and gauging the internal surface of the viewing portion of a cathode ray tube face plate having the viewing portion in a flange which comprises:

a plurality of circumferentially spaced pads on which said face plate is adapted to be placed with the flange of the face plate extending downwardly and engaging said pads, means for moving said pads downwardly and upwardly, a plurality of fluid bearing pads positioned in the path of said face plate as the face plate is lowered, each said fluid bearing pad having an opening through which fluid is applied so that when the face plate reaches the position adjacent said fluid bearing pads, said face plate is supported by a film of fluid passing between said fluid bearing pads and the inner surface of the viewing portion of a face plate, a plurality of sensing nozzles, means associated with each said nozzle and mounted in fixed relation to said fluid bearing pads for supporting each nozzle for movement generally toward and away from the inner surface of the viewing portion of the face plate, said nozzle having a surface against which fluid under pressure is directed for urging said nozzle upwardly toward said surface to be gauged, means for supplying fluid to each said nozzle whereby said nozzle directs fluid against the lower inner surface of the viewing portion of the face plate such that said nozzle is levitated in predetermined relation to said surface by the combined action of the forces due to fluid pressure on said nozzle and the forces due to fluid flowing through said nozzle and due to fluid flowing between said nozzle and said surface, and means responsive to the position of each said nozzle.

4. The combination set forth in claim 3 including means responsive to the lowering of the face plate into position over the bearing pads for supplying fluid to said fluid bearing pads and said nozzle.

5. The combination set forth in claim 3 including means for heating the fluid supplied to said fluid bearing pads and said nozzles.

6. The combination set forth in claim 5 including means for causing a small flow of heated fluid through said bearing pads and said nozzles when said supports are elevated.

7. An apparatus for supporting and gauging the internal surface of the viewing portion of a cathode ray tube face plate having the viewing portion and a flange which comprises:

a plurality of circumferentially spaced pads on which said face plate is adapted to be placed with the flange of the face plate extending downwardly and engaging said pads, means for moving said pads downwardly and upwardly, a plurality of fluid bearing pads positioned in the path of said face plate as the face plate is lowered, each said fluid bearing pad having an opening through which fluid is applied so that when the face plate reaches the position adjacent said fluid bearing pads, said face plate is supported by a film of fluid passing between said fluid bearing pads and the inner surface of the viewing portion of a face plate, a plurality of sensing nozzles, a housing associated with each said nozzle and mounted in fixed relation to said fluid bearing pads for supporting each nozzle for movement generally toward and away from the inner surface of the viewing portion of the face plate, each said nozzle having an orifice at its upper end, each said nozzle having an intermediate area thereof within said housing against which fluid under pressure is applied, means for supplying fluid to said surface of said orifice of each said nozzle whereby said nozzle directs fluid upwardly against the inner surface of the viewing portion of the face plate such that the nozzle is levitated in predetermined relation to said surface by the combined action of the forces due to fluid pressure on said nozzle and the forces due to pressure of fluid flowing through said nozzle and due to fluid flowing between said nozzle and said surface, and means responsive to the position of said nozzle in said housing.

8. The method of gauging the relative position of the surface of an article which comprises:

supporting said article by a plurality of fluid bearing pads which direct a film of fluid between a supporting portion of the article and the pads, positioning a housing in fixed relation adjacent the surface of the article to be gauged, providing a chamber in said housing, supplying fluid under pressure to said chamber, supporting a nozzle within said housing for relatively free movement with respect to said housing in a direction toward and away from said surface, said nozzle having an axial opening and an outlet opening in the outlet end thereof and at least two oppositely disposed surfaces of unequal pressure areas defining a net pressure effective area within said chamber against which fluid under pressure may be directed to urge said nozzle toward said surface to be gauged, causing said fluid to flow into said chamber against said oppositely disposed surfaces and from said chamber into said axial nozzle opening, directing a jet of said fluid from said outlet opening against said surface, such that said nozzle is levitated in constant spaced relation to said surface by the combined action of said force of fluid on said nozzle and the forces due to said fluid flowing from said outlet opening and due to said fluid flowing laterally between said nozzle and said surface, and sensing the relative position of said nozzle.

9. The method of gauging the relative position of the surface of an article which comprises:

positioning a housing in fixed relation adjacent the surface of the article to be gauged, providing a chamber in said housing, supplying fluid under pressure to said chamber, supporting a nozzle within said housing for relatively free movement with respect to said housing in a direction toward and away from said surface, said nozzle having an axial opening and an outlet opening in the outlet end thereof and at least two oppositely disposed surfaces of unequal pressure areas defining a net pressure effective area within said chamber against which fluid under pressure may be directed to urge said nozzle toward said surface to be gauged, causing said fluid to flow into said chamber against said oppositely disposed surfaces and from said chamber into said axial nozzle opening, directing a jet of said fluid from said outlet opening against said surface, such that said nozzle is levitated in constant spaced relation to said surface by the combined action of said force of fluid on said nozzle and the forces due to said fluid flowing from said outlet opening and due to said fluid flowing laterally between said nozzle and said surface, and sensing the relative position of said nozzle.

10. An apparatus for supporting and gauging an article comprises:

a pluraltiy of upwardly facing fluid bearing pads, each fluid bearing pad being adapted to direct fluid upwardly and support an article placed thereon by a continuously flowing film of fluid between the surface of the article and said pad, at least one sensing nozzle having an axial fluid opening therein, a housing in which said nozzle is positioned for movement axially with respect to said support in a direction along said axial fluid opening, said housing having a chamber therein, said nozzle having a hollow stem defining said axial fluid opening projecting into said chamber and an opening in said stem providing communication between said chamber and axial opening in said nozzle, means for supplying fluid to said housing and, in turn, through the opening in said stem to the axial opening of said nozzle, said nozzle having at least two oppositely disposed surfaces of unequal pressure areas defining a net pressure effective area spaced from the end thereof within said chamber against which fluid pressure is supplied such that when fluid is supplied to said nozzle, said nozzle is urged axially of the housing by the pressure on said area against the jet effect of fluid flowing through said nozzle and when said nozzle is adjacent a surface of an article to be gauged, said nozzle is levitated in predetermined relation to the surface of the article being gauged by a combined action of the forces due to fluid pressure on said area and the forces due to fluid flowing through said nozzle and between the end of said nozzle and the surface of the article being gauged.

11. A sensing assembly for inspecting the surface of an article which comprises:

a sensing nozzle having an axial fluid opening therein, a housing in which said nozzle is positioned for movement axially with respect to said support in a direction along said axial fluid opening, said housing having a chamber therein, said nozzle having a hollow stem defining said axial fluid opening projecting into said chamber and an opening in said stem providing communication between said chamber and axial opening in said nozzle, means for supplying fluid to said housing and, in turn, through the opening in said stem to the axial opening of said nozzle, said nozzle having at least two oppositely disposed surfaces of unequal pressure areas defining a net pressure effective area spaced from the end thereof within said chamber against which fluid pressure is supplied such that when fluid is supplied to said nozzle, said nozzle is urged axially of the housing by the pressure on said area against the jet effect of fluid flowing through said nozzle and when said nozzle is adjacent a scurface of an article to be gauged, said nozzle is levitated in predetermined relation to the surface of the article being gauged by a combined action of the forces due to fluid pressure on said area and the forces due to fluid flowing through said nozzle and between the end of said nozzle and the surface of the article being gauged.

References Cited

UNITED STATES PATENTS 2,276,036  3/1942  Hanna et al. _____ 73—37.7
3,194,055  7/1965  Knobel _____ 73—37.5

LOUIS R. PRINCE, *Primary Examiner.*

W. HENRY, *Assistant Examiner.*